United States Patent
Muthu et al.

(10) Patent No.: US 12,430,123 B2
(45) Date of Patent: Sep. 30, 2025

(54) GENERATIVE AI SYSTEM FOR AUTOMATED PROGRAMMING AND ACCELERATED CODE MODIFICATION

(71) Applicant: INTUIT INC., Mountain View, CA (US)

(72) Inventors: Malathy Muthu, The Woodlands, TX (US); Ankita Sinha, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 222 days.

(21) Appl. No.: 18/513,159

(22) Filed: Nov. 17, 2023

(65) Prior Publication Data

US 2025/0165247 A1    May 22, 2025

(51) Int. Cl.
    *G06F 9/44*    (2018.01)
    *G06F 8/30*    (2018.01)
    *G06F 8/658*   (2018.01)

(52) U.S. Cl.
    CPC .............. *G06F 8/658* (2018.02); *G06F 8/30* (2013.01)

(58) Field of Classification Search
    CPC ................... G06F 8/658; G06F 8/30
    See application file for complete search history.

(56) References Cited

U.S. PATENT DOCUMENTS

| | | | |
|---|---|---|---|
| 2018/0189369 A1* | 7/2018 | Baek | G06F 40/197 |
| 2022/0244937 A1* | 8/2022 | Prasad | G06N 5/022 |
| 2022/0245506 A1* | 8/2022 | Niu | G06N 20/00 |
| 2024/0020096 A1* | 1/2024 | Chen | G06F 40/30 |

* cited by examiner

*Primary Examiner* — Hang Pan
(74) *Attorney, Agent, or Firm* — Patterson + Sheridan, LLP (57) ABSTRACT

Aspects of the present disclosure relate to automatically updating a software application to ensure compliance with an updated data source. Embodiments include providing an embedding of a first version of a data source and an embedding of a second version of the data source to a comparison engine configured to compare the embedding of the first version of the data source and the embedding of the second version of the data source and generate a data source difference summary. Embodiments further include providing an embedding of a software application code module and the data source difference summary to a code update engine trained to generate an updated version of the software application code module based on the embedding of the software application code module and the data source difference summary. Embodiments further include updating code of the software application using the updated version of the software application code module.

20 Claims, 5 Drawing Sheets

GENERATIVE AI SYSTEM FOR AUTOMATED PROGRAMMING AND ACCELERATED CODE MODIFICATION

Aspects of the present disclosure relate to techniques for automatically updating a software application to ensure compliance with an updated data source. In particular, techniques described herein involve comparing two versions of a data source and automatically generating updated software application code in response to changes in the newer version of the data source.

BACKGROUND

Every year millions of people, businesses, and organizations around the world utilize software applications to assist with countless aspects of life. For example, many individuals and businesses rely on software applications for performing complex activities such as filing tax returns or conducting research. These software applications simplify what would otherwise be complex and tedious tasks.

For these software applications to remain effective in assisting users, they must be routinely updated in response to changes in the data sources on which they rely. For example, updates to tax return software must take into account any changes in tax laws, regulations, forms, etc. Tax laws and regulations can span several thousands of pages for a single jurisdiction, and any changes to the laws and regulations could necessitate changes to thousands of lines of software code. This makes updating tax software code an arduous task that requires an immense amount of manual labor to perform. Also, the complexity and length of the task raises a chance for human error. Furthermore, there are many challenges associated with automating aspects of such software application code updates. For example, while two versions of a data source could be automatically compared to determine differences (e.g., a diff operation), such a comparison would provide no insight into how such differences relate to existing software application code, and would provide no indication of how the existing software application code should be updated based on such differences.

As such, there is a need in the art for improved techniques of updating a software application to ensure compliance with an updated data source.

BRIEF SUMMARY

Certain embodiments provide a method for automatically updating a software application to ensure compliance with an updated data source. The method generally includes: providing an embedding of a first version of a data source and an embedding of a second version of the data source to a comparison engine, wherein the comparison engine has been configured to compare the embedding of the first version of the data source and the embedding of the second version of the data source and generate a data source difference summary that is based on differences between the embedding of the first version of the data source and the embedding of the second version of the data source; providing an embedding of a software application code module and the data source difference summary to a code update engine, wherein the code update engine comprises one or more machine learning models that have been trained to generate an updated version of the software application code module based on the embedding of the software application code module and the data source difference summary; and updating code of the software application using the updated version of the software application code module.

Other embodiments provide a method for automatically updating a software application to ensure compliance with an updated data source. The method generally includes: creating an embedding of a first version of a data source; creating an embedding of a second version of the data source; providing the embedding of the first version of the data source and the embedding of the second version of the data source to a comparison engine, wherein the comparison engine has been configured to compare the embedding of the first version of the data source and the embedding of second version of the data source and generate a data source difference summary that is based on differences between the embedding of the first version of the data source and the embedding of the second version of the data source; creating an embedding of a software application code module; providing the embedding of the software application code module and the data source difference summary to a first machine learning model, wherein the first machine learning model has been trained to generate an application code change instruction, based on the data source difference summary and the embedding of the software application code module, that indicates one or more changes to the software application code module; and providing the embedding of the software application code module and the application code change instruction to a second machine learning model, wherein the second machine learning model has been trained to generate an updated version of the software application code module based on the embedding of the software application code module and the application code change instruction; and updating code of the software application using the updated version of the software application code module.

Other embodiments provide a system comprising one or more processors and a non-transitory computer-readable medium comprising instructions that, when executed by the one or more processors, cause the system to perform a method. The method generally includes: providing an embedding of a first version of a data source and an embedding of a second version of the data source to a comparison engine, wherein the comparison engine has been configured to compare the embedding of the first version of the data source and the embedding of the second version of the data source and generate a data source difference summary that is based on differences between the embedding of the first version of the data source and the embedding of the second version of the data source; providing an embedding of a software application code module and the data source difference summary to a code update engine, wherein the code update engine comprises one or more machine learning models that have been trained to generate an updated version of the software application code module based on the embedding of the software application code module and the data source difference summary; and updating code of the software application using the updated version of the software application code module.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for automatically updating a software application to ensure compliance with an updated data source.

According to certain embodiments, embeddings are used to automatically determine semantic differences between two versions of a data source, and the semantic differences are used in a particular machine learning based process to automatically identify and update relevant software application code with a high degree of accuracy.

In an example, an embedding of a first version of a data source and an embedding of a second version of the data source are compared to determine the differences between the first version and the second version of the data source. A data source is generally any electronic source of any type of data or information. Examples of data sources include regulatory codes, statutes, forms, guides, encyclopedias, compendiums, databases, websites, dictionaries, thesauruses, instructions, spreadsheets, other documents, and/or the like.

In some embodiments, a data source comparison engine may compare a first version of a data source and a second version of the data source in order to generate a data source difference summary that is based on differences between the first version of the data source and the second version of the data source. As an example, the data source comparison engine may comprise one or more natural language processing algorithm and/or one or more machine learning models, such as a Bidirectional Encoder Representations from Transformer (BERT) model, a generative pre-trained (GPT) model, and/or the like. Furthermore, the data source comparison engine may use cosine similarity or a Jaccard index to determine similarity between the two versions of the data source (e.g., which may involve comparing embeddings of the two versions). For example, the data source comparison engine may compare a tax statute from the prior year to an amended version of the same tax statute from the current year. To compare the two versions of the tax statute, embeddings of each version of the statute may be created. As a particular example, the embeddings may be created at a one thousand character granularity (e.g., creating an embedding of a version of a data source may involve creating multiple embeddings, such as an embedding of each successive one thousand characters), although other granularities may be used. After the embeddings are created, each embedding may be provided to the data source comparison engine, which may compare the embedding of the first version of the tax statute and the embedding of the second version of the tax statute. Based on this comparison, the comparison engine may create a data source difference summary. As an example, the data source difference summary may contain checkpoints or other indicators representing portions of the embedding of the current year's tax statute that changed compared to the previous year's tax statute.

According to certain embodiments, an embedding of a software application code module is created and provided to a code update engine. A software application code module may be a section of software application code that corresponds to a particular part of the software application. For example, a portion of an income tax filing software application that is used for calculating individual income tax at the state level in one particular state may have its own code module. As another example, the portion of the tax filing software application dedicated to calculating business expense deductions may have its own code module. The embedding of the software application code module may also include embeddings of subsets of the software application code module, and the subsets of the software application code module may correspond to a configured subset size.

In some embodiments, an embedding of a software application code module and a data source difference summary (e.g., generated as described above) are provided to a code update engine, which then updates the software application code based on the embedding of the software application code module and the data source difference summary. The code update engine may comprise one or more machine learning models that have been trained to generate an updated version of a software application code module in a semantically and syntactically correct manner based on an embedding of the software application code module and a data source difference summary. Training of such machine learning model(s) is described in more detail below. As an example, an embedding of a software application code module for a software application corresponding to personal income tax filings at the state level in a particular state may be provided to the code update engine. Also, a data source difference summary summarizing the differences in that state's tax statute in the present year compared to the year prior may be provided to the code update engine (e.g., such a data source difference summary may be generated by a comparison engine as described above). Based on the embedding of the software application code module and the data source difference summary, the code update engine may then update the software application code to take into account any changes in the state's tax statute over the previous year.

In some embodiments, the code update engine updates the software application code by first generating updated versions of software application code modules based on the data source difference summary and embeddings of the application code modules, and then updating the software application code by replacing the old software application code modules with the updated software application code modules. For example, for a tax filing software application that calculates individual income tax at the state and federal level, there may be several software application code modules that require updates following amendments to the state and/or federal tax statutes. The code update engine may receive a data source difference summary for the state and/or federal tax statute(s) summarizing changes in each statute from the prior year to the current year. The code update engine may also receive embeddings of each software application code module in the application. The code update engine may then generate updated software application code modules, and use these new modules to replace the old modules, thus updating the software application code.

In some embodiments, the code update engine includes a first machine learning model that is trained to generate an application code change instruction that describes how to update the software application code modules based on the embedding of the software application code module and the data source difference summary. As an example, the first machine learning model may be a natural language processing algorithm such as a large language model. The large language model may receive an embedding of a software application code module and a data source difference summary as inputs. Then, the large language model may generate instructions that describe how to update the software application code module or subsets within the software application code module to comply with changes in the data source. For example, the first machine learning model may be trained to generate instructions that describe how to update tax software application code modules based on changes in tax statutes. Given an embedding of a tax software application code module and a data source difference summary that summarizes the differences between the current year's tax statute and the previous year's tax statute, the first machine learning model may generate an application code change instruction. This application code change instruction may include instructions to update features such as variables and formulas in the software application code module. For example, if a state's personal income tax rate was 4% in the previous year, but was changed to 5% in the current year, then the software application code change instruction may indicate which parts of the software application code module correspond to the state's personal income tax rate. Also, the application code change instruction may provide an instruction to change the state's personal income tax variable from 0.04 to 0.05 in each location where the state's personal income tax percent variable appears.

In some embodiments, the code update engine includes a second machine learning model that is trained to generate an updated version of the software application code module in a semantically and syntactically correct manner based on an embedding of the software application code module and the application code change instruction. For example, the second machine learning model may be a generative model such as a Generative Adversarial Network (GAN) or a Variational Autoencoder (VAE). The second machine learning model may receive an embedding of a software application code module and an application code change instruction as inputs. Then, the second machine learning model may generate new software application code. For example, the second machine learning model may receive an embedding of a tax software application code module and an application code change instruction. The application code change instruction may contain an indication of where the personal income tax variable is located within the software application code module and an instruction to change the personal income tax variable from 0.04 to 0.05. Based on the embedding of the software application code module and the application code change instruction, the second machine learning model may generate an updated software application code module wherein the personal income tax variable is set to 0.05 instead of 0.04. Furthermore, the old software application code module may be replaced with the new software application code module, thus producing an updated version of the software application code.

According to some embodiments, the second machine learning model may be trained through a supervised learning process to generate updated software application code modules that are semantically and syntactically consistent with existing software code. This training process may use training data that is based on manual updates to code modules in response to changes in data sources or manually verified automatic updates to code modules in response to changes in data sources. In some embodiments, a pre-trained model may be further trained (e.g., fine-tuned) for a particular software application's code base. The training process ensures that the updates to the code will be made according to the software application code change instruction. Also, the training process ensures that the updated software application code modules will fit seamlessly into the software application code. In some embodiments, updated software application code modules may be added to the training data set (e.g., when such updated software application code modules are verified by a user). Also, user feedback regarding an updated software application code module may be used to update the training set. This allows the second machine learning model to be continuously improved and retrained based on newly updated software application code modules and user feedback.

In certain embodiments, a user feedback engine may be used to collect and process user feedback. The feedback may be an answer to a multiple choice question about the quality of the updated software application code or code modules. The feedback may be natural language feedback. The feedback engine may include a natural language processing algorithm such as a large language model. The natural language processing algorithm may be applied to determine what the user liked or did not like about the updated software application code as well as any issues that need to be addressed regarding the updated software application code (e.g., formatting). The information gathered by the feedback engine may then be used to train the second machine learning model. Feedback may also be received in the form of a user accepting or rejecting an automatically updated software application code module, or a user modifying an automatically updated software application code module.

Embodiments of the present disclosure provide numerous technical and practical effects and benefits. For instance, comparing versions of data sources manually can require reviewing thousands of pages of dense information. Additionally, updating software application code modules to comply with changes to data sources can require edits to thousands of lines of code. As a result, updating software application code modules to comply with updated data sources is a task that often requires a large team of workers and several months' worth of effort. Additionally, the amount of change that may be required and the complexity of data sources greatly increase the risk for human error. These problems are compounded by the fact that data sources are often updated yearly or even multiple times per year. Furthermore, there are many challenges associated with attempting to automatically update software application code based on changes to a data source using existing techniques such as performing a diff operation to determine changes to the data source. For example, performing such a diff operation would provide no insight into how identified differences relate to existing software application code, and would provide no indication of how the existing software application code should be updated based on such differences. As an alternative to manually updating software application code or attempting to automatically update software application code based on an existing automated diff operation, the present disclosure automatically updates software application code using embeddings and machine learning techniques to ensure compliance with updated data sources and to ensure semantic and syntactic correctness. In addition to updating code modules more efficiently, the present disclosure also updates the code modules more accurately and consistently than can a team of programmers. Furthermore, by utilizing embeddings and machine learning techniques in a particular process, embodiments of the present disclosure enable what could not be done previously (e.g., automated software application code updates based on changes to data sources), because existing techniques such as diff operations did not provide the semantic and syntactic insight needed to perform such automated code updates. The accuracy and consistency of techniques described herein are continuously improved by user feedback in response to automatically generated software application code modules. Also, the accuracy and consistency of the software application code generated by the present disclosure improve the experience for users of the software application, because the software application will make fewer errors if the code is correct.

Additionally, by updating software application code modules in an accurate manner that is continuously improved based on training and user feedback, the present disclosure conserves processor resources that would otherwise be used in generating inaccurate software application code and processing corrections to such inaccurate code. Also, the accurate software application code produced by the present disclosure conserves processor resources that would otherwise be wasted by executing inaccurate software application code.

Figure 1:
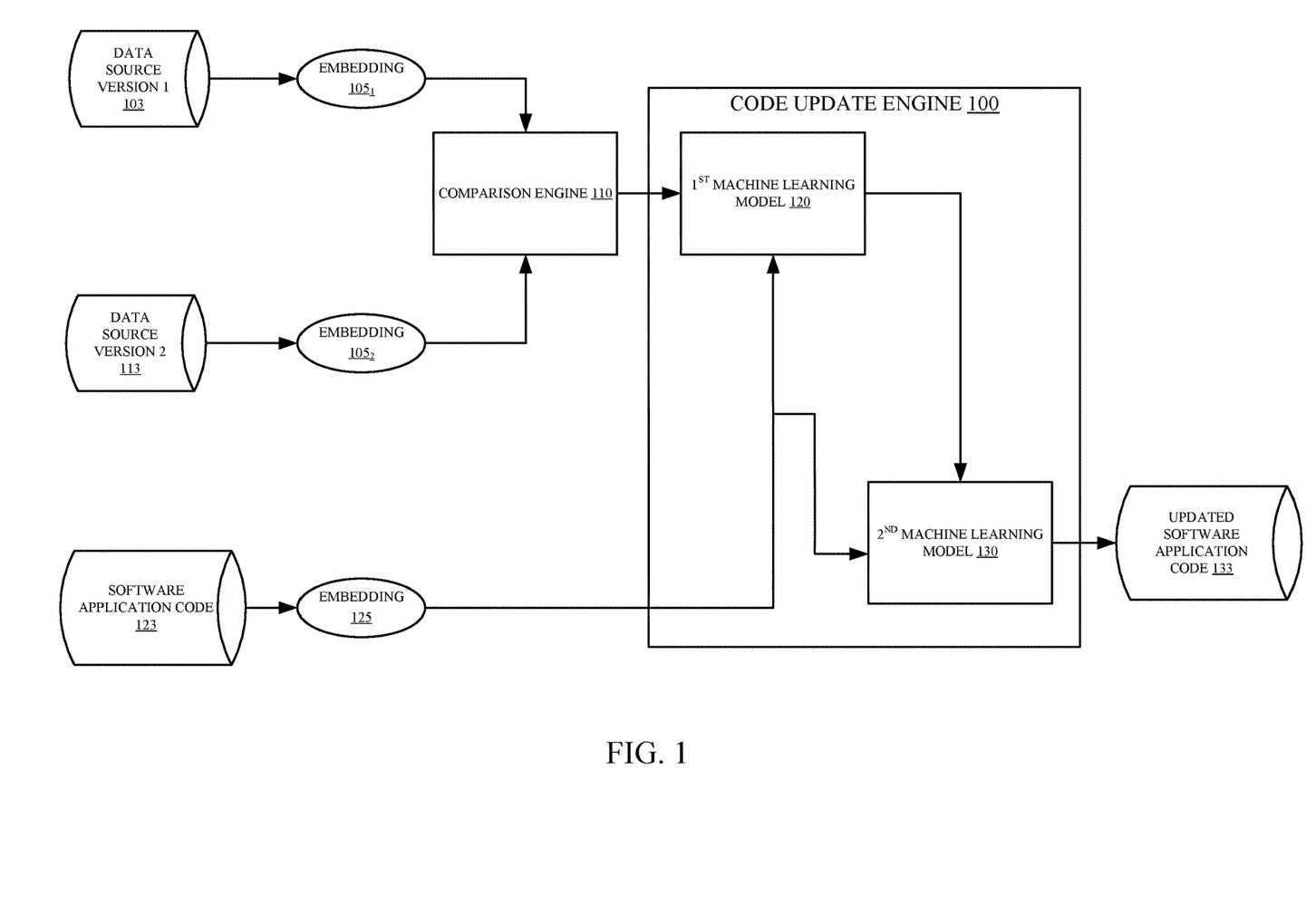
FIG. 1 depicts an example of computing components related to automatically updating a software application to ensure compliance with an updated data source.

Example Components Related to Automatically Updating a Software Application to Ensure Compliance with an Updated Data Source FIG. 1 is an illustration of example computing components related to automatically updating a software application to ensure compliance with an updated data source.

Embeddings 1051 and 1052 (collectively, embeddings 105) are created of a first version of a data source 103 and a second version of a data source 113. An embedding generally refers to a vector representation of an entity that represents the entity as a vector in n-dimensional space such that similar entities are represented by vectors that are close to one another in the n-dimensional space. Embeddings may be generated through the use of an embedding model, such as a neural network or other type of machine learning model that learns a representation (embedding) for an entity through a training process that trains the neural network based on a data set, such as a plurality of features of a plurality of entities. In one example, the embedding model comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating embeddings are possible.

Embeddings 105 may be created at a selected granularity. As a particular example, the embeddings may be created at a one thousand character granularity (e.g., creating an embedding of a version of a data source may involve creating multiple embeddings, such as an embedding of each successive one thousand characters), although other granularities may be used. Data sources 103, 113 generally include any electronic source of any type of data or information, such as regulatory codes, statutes, forms, guides, encyclopedias, compendiums, databases, websites, dictionaries, thesauruses, instructions, spreadsheets, other documents, and/or the like. The first version of a data source 103 is generally a version of the data source that precedes an update to the data source. The second version of the data source 113 is generally a version of the data source that was produced after an update was made to the data source.

Once the first version of a data source 103 and the second version of the data source 113 have been processed to create embeddings 105, the embeddings of the data sources are provided to a comparison engine 110 that compares the versions of the data source 103 and 113 based on the embeddings 105 of the versions. The comparison engine 110 may comprise one or more natural language processing algorithms and/or one or more machine learning models, such as a Bidirectional Encoder Representations from Transformer (BERT) model, a generative pre-trained (GPT) model, and/or the like. The comparison engine 110 may, for example, use cosine similarity or a Jaccard index to determine similarity between the two versions of the data source, 103 and 113 (e.g., which may involve comparing embeddings of the two versions 103 and 113). The output of the comparison engine 110 may contain checkpoints or other indicators that represent different portions of the embedding of the current year's data source (e.g., embedding 1052) that changed compared to the embedding of previous year's data source (e.g., embedding 1051). A checkpoint may include, for example, portions of the embeddings 105 of the versions of the data sources 103 and 113 that contain a change. The output may also include a description the changes made at each checkpoint.

Embeddings 125 of modules within the software application code 123 are also created. Embeddings 125 of the modules may be created at a selected granularity. As a particular example, the embeddings may be created at a one thousand character granularity (e.g., creating an embedding of software application code module may involve creating multiple embeddings, such as an embedding of each successive one thousand characters), although other granularities may be used. The software application code 123 may correspond to any type of software application that has been configured to comply with a data source 103 and/or 113. As an example, a translation software application may be configured to comply with dictionaries and thesauruses of various languages. As another example, a tax preparation software application may be configured to comply with tax laws and regulations.

The output of the comparison engine 110 and the embeddings 125 of the software application code 123 are provided to a code update engine 100, which is further described below with respect to FIG. 2. The code update engine 100 includes one or more machine learning models, and has been trained to generate updated software application code 133 based on embeddings 125 of modules of the software application code 123 and the output of the comparison engine 110. The output of the comparison engine 110, which indicates to the code update engine 100 the changes in the second version of the data source 113 compared to the first version 103, allows the code update engine 100 to generate updated versions of the modules of the software application code 133 when provided with the embeddings 125 of the old versions of the modules of software application code 123.

The code update engine 100 may update the code within the module by changing one or more subsets of the code within the module. The modules of the software application code 123 may contain comments and/or other descriptors that describe what lines of code, formulas, variables, etc. correspond to different portions of the data source. For example, if the output of the comparison engine 110 indicates to the code update engine 100 that the personal income tax rate for a state has changed from 4% to 5%, the code update engine 100 may determine what variable(s) and/or other logic in software application code 123 correspond to the personal income tax rate for that state based on embedding 125, which may include embeddings of comments, variable labels, other descriptors, other context clues, and/or the like. Using the information contained within the embedding 125 of the software application code 123 and the output of the comparison engine 110, the code update engine 100 generates updated software application modules. The code update engine 100 may also replace the original modules in the software application code 123 with the updated modules, thus producing an updated version of the software application code 133.

The code update engine 100 may include a first machine learning model 120 that is trained to generate instructions that describe how to update a module of software application code 123 based on the embedding 125 of the module of the software application code 123 and the output of the comparison engine 110. The instructions may be, for example, a plain language description of how to update the module of the software application code 123. The instructions may include which variables, formulas, or other portions of the software application code should be updated in response to changes in the data source. The first machine learning model 120 may be, for example, a natural language processing algorithm such as a large language model. The first machine learning model 120 may recognize what portions of the software application code 123 correspond to the changed portions of the data source 113 because the software application code 123 contains comments, variable labels, other descriptors, other context clues, and/or the like, and the embedding 125 reflects the semantic meaning of these and other aspects of the code in a manner that can be compared with the semantic meaning reflected in identified changes between embeddings of different versions of a data source. For example, the first machine learning model 120 may be provided with a prompt such as "generate a set of instructions indicating how the software application code module represented by the included embedding should be updated in response to the following changes in an underlying data source," and the output from comparison engine 110 (e.g., the summary of changes to the data source) and embedding 125 may be included as context with the prompt. This is included as an example, and other techniques of providing inputs to the first machine learning model 120 are possible. The first machine learning model 120 may output a list of changes to be made to one or more code modules of software application code 123.

In some embodiments, the first machine learning model 120 was trained on a large data set, such as in advance by a third party. The first machine learning model 120 may also be trained or fine-tuned for software application code 123 more particularly, such as based on historical changes that were made to software application code 123 (or other software application code) in response to historical changes to one or more data sources. For example, a training data instance may include a data source change summary (e.g., generated by comparison engine 110) and an embedding of a software application code module associated with a label indicating a list of changes that were made to the software application code module in response to the data source change. Supervised learning techniques or semi-supervised learning techniques may be used to train or fine-tune the first machine learning model based on such training data instances or other types of training data instances.

Supervised learning generally involves providing training inputs as inputs to a machine learning model. The machine learning model processes the training inputs and generates outputs based on the training inputs. The outputs are compared to known labels associated with the training inputs (e.g., ground truth labels based on historical data that is manually produced or verified) to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the outputs produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model, such as based on validation data and test data, as is known in the art.

The code update engine 100 may include a second machine learning model 130 that is trained to generate updated modules of software application code 123. The second machine learning model 130 may be, for example, a generative model such as a Generative Adversarial Network (GAN) or a Variational Autoencoder (VAE). The instructions on how to update the modules generated by the first machine learning model 120 along with the embedding 125 of the software application code 123 are provided to the second machine learning model 130. Using these inputs, the second machine learning model 130 generates updated modules of the software application code that are semantically and syntactically correct. The second machine learning model 130 may also generate a new code module by changing one or more subsets of the software application code module.

The second machine learning model 130 may be trained or fine-tuned using existing software application code 123 to ensure that the code that is generated is semantically and syntactically correct. In some embodiments, the second machine learning model 130 may be trained using training data that is based on manual updates to code modules in response to changes in data sources or manually verified automatic updates to code modules in response to changes in data sources. In some embodiments, a pre-trained model may be further trained (e.g., fine-tuned) for a particular software application's code base. For example, a training data instance may include code change instructions (e.g., generated by first machine learning model 120 or otherwise) and an embedding of a software application code module associated with a label including a changed version of the software application code module (e.g., the label may be based on based on manual updates to the code module or manually verified automatic updates to the code module).

Supervised learning techniques or semi-supervised learning techniques may be used to train or fine-tune the second machine learning model based on such training data instances or other types of training data instances.

Additionally, as described in greater detail below with respect to FIG. 2, user feedback regarding an updated software application code module may be used to update the training set. This allows the second machine learning model to be continuously improved and retrained based on newly updated software application code modules and user feedback.

Once an updated software application code module is generated, it may be inserted (e.g., by code update engine 100) into software application code 123 as a replacement for the former version of that software application code module, thus producing updated software application code 133. The software application may then be executed with the updated code, and may perform operations that comply with the updated version of the data source as a result of the code updates. For example, a tax preparation software application may provide functionality that complies with an updated version of a tax code or other tax-related laws or regulations as a result of automatic code updates performed using techniques described herein.

Figure 2:
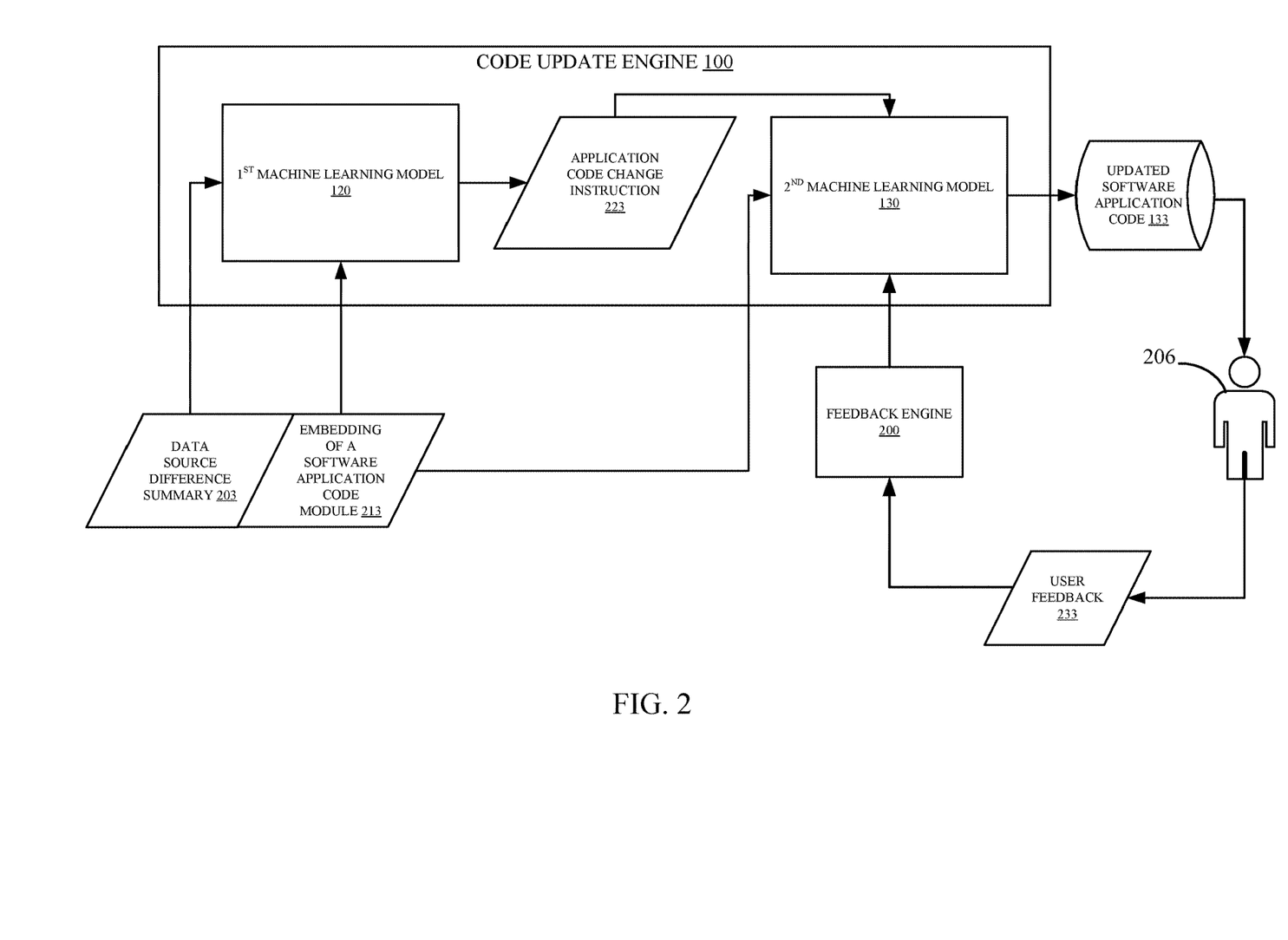
FIG. 2 depicts an example of computing components related to automatically updating a software application to ensure compliance with an updated data source.

Example of Computing Components Related to Automatically Updating a Software Application to Ensure Compliance with an Updated Data Source FIG. 2 is an illustration of example computing components related to automatically updating a software application to ensure compliance with an updated data source.

A data source difference summary 203 is a summary of the differences between a first version of a data source and a second version of the data source. The data source difference summary 203 may contain, for example, portions of the embeddings of the first and second versions of the data source that contain a change, and/or a description of the change that has been made. For example, data source difference summary 203 may have been generated by comparison engine 110 of FIG. 1.

The data source difference summary 203 and an embedding of a software application code module 213 are provided to the first machine learning model 120 of the code update engine 100. The first machine learning model 120 outputs an application code change instruction 233 based on the data source difference summary 203 and the embedding of the software application code module 213, as described above. The application code change instruction 223 is then provided along with the embedding of the software application code module 213 as inputs to the second machine learning model 130. The second machine learning model 130 generates an updated software application code module, and this module is inserted into the software application code in place of the existing corresponding code module, thus producing an updated software application code 133.

A user 206 can evaluate each updated software application code module and/or the updated software application code 133 as a whole. A user feedback engine 200 can then prompt the user 206 to provide user feedback 233 with regards to the updated software application code modules and/or the updated software application code 133 (or user 206 may provide such feedback without being prompted). The user feedback 233 may include an answer to a multiple choice question about the quality of the updated software application code or code modules. The user feedback 233 may include natural language feedback. The feedback engine 200 may include a natural language processing algorithm such as a large language model. The natural language processing algorithm may be applied to determine what the user 206 liked or did not like about the updated software application code 133 as well as any issues that need to be addressed regarding the updated software application code 133 (e.g., formatting). Feedback may also be received in the form of a user accepting or rejecting an automatically updated software application code module, or a user modifying an automatically updated software application code module. The information gathered by the feedback engine 200 may then be used to re-train one or more of the machine learning models in the code update engine 100. For example, new training data may be generated for the second machine learning model 130 based on the user feedback 233 (e.g., indicating a manually corrected or verified code module) and the second machine learning model 130 may be re-trained based on the new training data for improved accuracy in an interactive feedback loop. While not shown, the first machine learning model 120 may also be re-trained in a similar manner based on user feedback 233. For example, if user feedback 233 includes a verification of an updated software application code module, the application code change instruction used to create the updates software application code module may be considered user-verified, and so may be used as new training data to re-train the first machine learning model 120. Similarly, if user feedback 233 indicates that a software application code module was incorrectly modified and that changes need to be made to the application code change instructions (or if the user provides corrected application code change instructions), modified application code change instructions may be used as new training data to re-train the first machine learning model 120.

Figure 3:
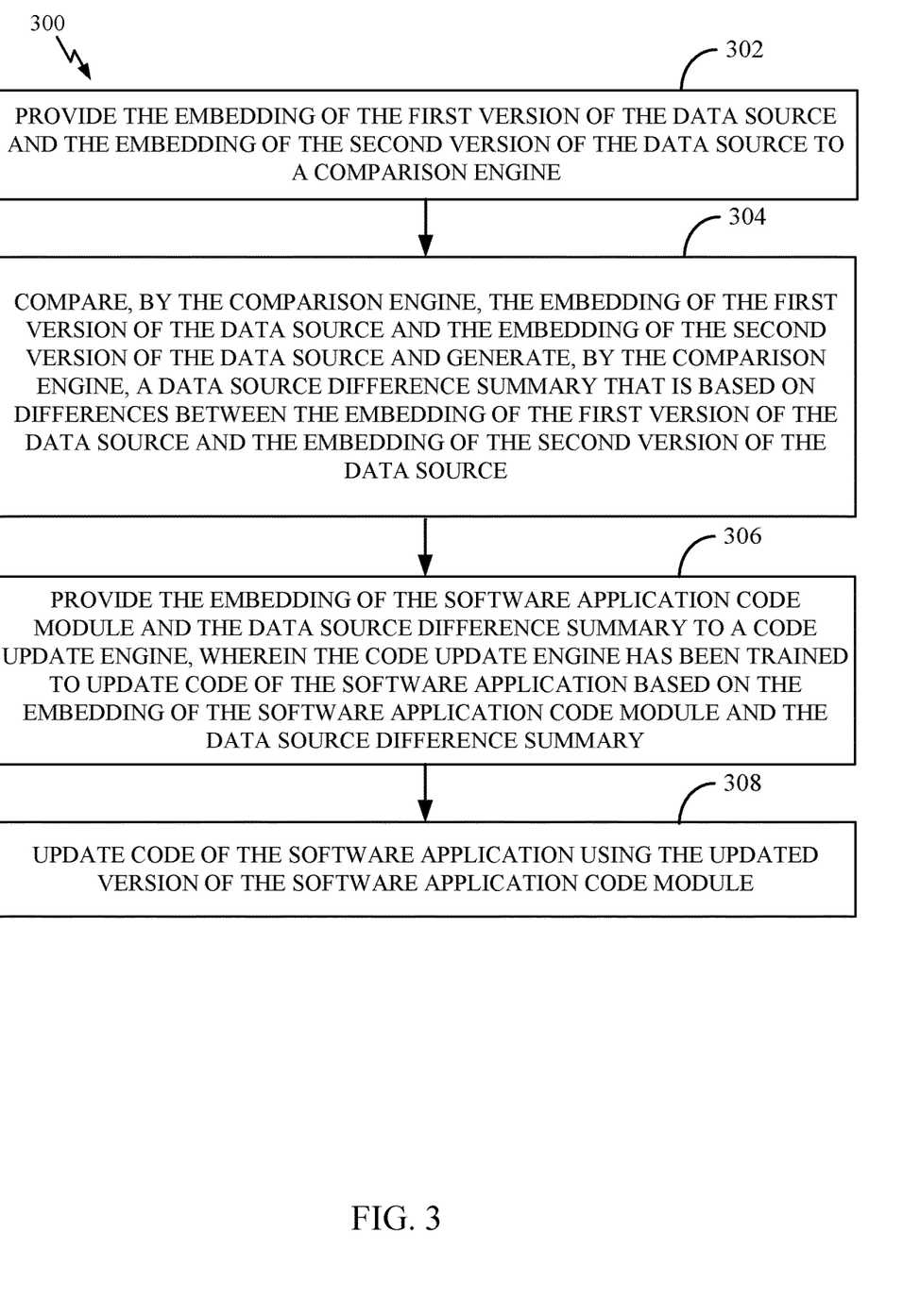
FIG. 3 depicts example operations related to automatically updating a software application to ensure compliance with an updated data source.

Example Operations Related to Automatically Updating a Software Application to Ensure Compliance with an Updated Data Source FIG. 3 depicts example operations 300 related to automatically updating a software application to ensure compliance with an updated data source. For example, operations 300 may be performed by one or more of the components described in FIG. 1 and FIG. 2.

Operations 300 begin at step 302 with providing an embedding of a first version of a data source and an embedding of a second version of a data source to a comparison engine. Data sources generally include any electronic source of any type of data or information, such as regulatory codes, statutes, forms, guides, encyclopedias, compendiums, databases, websites, dictionaries, thesauruses, instructions, spreadsheets, other documents, and/or the like. The software application code may correspond to any type of software application that has been configured to comply with a data source. In addition, each module may contain subsets, wherein the subsets of the module correspond to a configured subset size. In some embodiments, embeddings may be created at a selected granularity. As a particular example, the embeddings may be created at a one thousand character granularity (e.g., creating an embedding of a version of a data source may involve creating multiple embeddings, such as an embedding of each successive one thousand characters), although other granularities may be used.

Operations 300 continue at step 304 with comparing, by the comparison engine, the embedding of the first version of the data source and the embedding of the second version of the data source and generating, by the comparison engine, a data source difference summary that is based on differences between the embedding of the first version of the data source and the embedding of the second version of the data source. In some embodiments, the data source comparison engine may, for example, use cosine similarity or a Jaccard index to determine similarity between the two versions of the data source (e.g., which may involve comparing embeddings of the two versions) and generate the data source difference summary. In some cases, the comparison engine may use one or more machine learning models to compare the embeddings and produce the data source difference summary, such as a Bidirectional Encoder Representations from Transformer (BERT) model, a generative pre-trained (GPT) model, and/or the like. The first version of a data source is generally a version of the data source that precedes an update to the data source. The second version of the data source is generally a version of the data source that was produced after an update was made to the data source.

In some embodiments, the data source difference summary may contain, for example, a description of the change that has been made and/or portions of the embeddings of the first and second versions of the data source that contain a change.

Operations 300 continue at step 306 with providing the embedding of the software application code module and the data source difference summary to a code update engine, wherein the code update engine has been trained to update code of the software application based on the embedding of the software application code module and the data source difference summary. In some embodiments, the code update engine includes one or more machine learning models, and has been trained to generate an updated software application code module in a semantically and syntactically correct manner based on an embedding of a software application code module and the data source difference summary.

Operations 300 continue at step 308 with updating code of the software application using the updated version of the software application code module. In some embodiments, the code update engine updates the software application code by scanning the software application code for the module that corresponds to the newly generated software application code module, and replacing the code for that module with the code for the newly generated module. In other embodiments, the updated software application code may be generated by manually inserting the updated software application code module into the software application code, or by another method of replacing an old module of code with a new module of code within an application.

Figure 4:
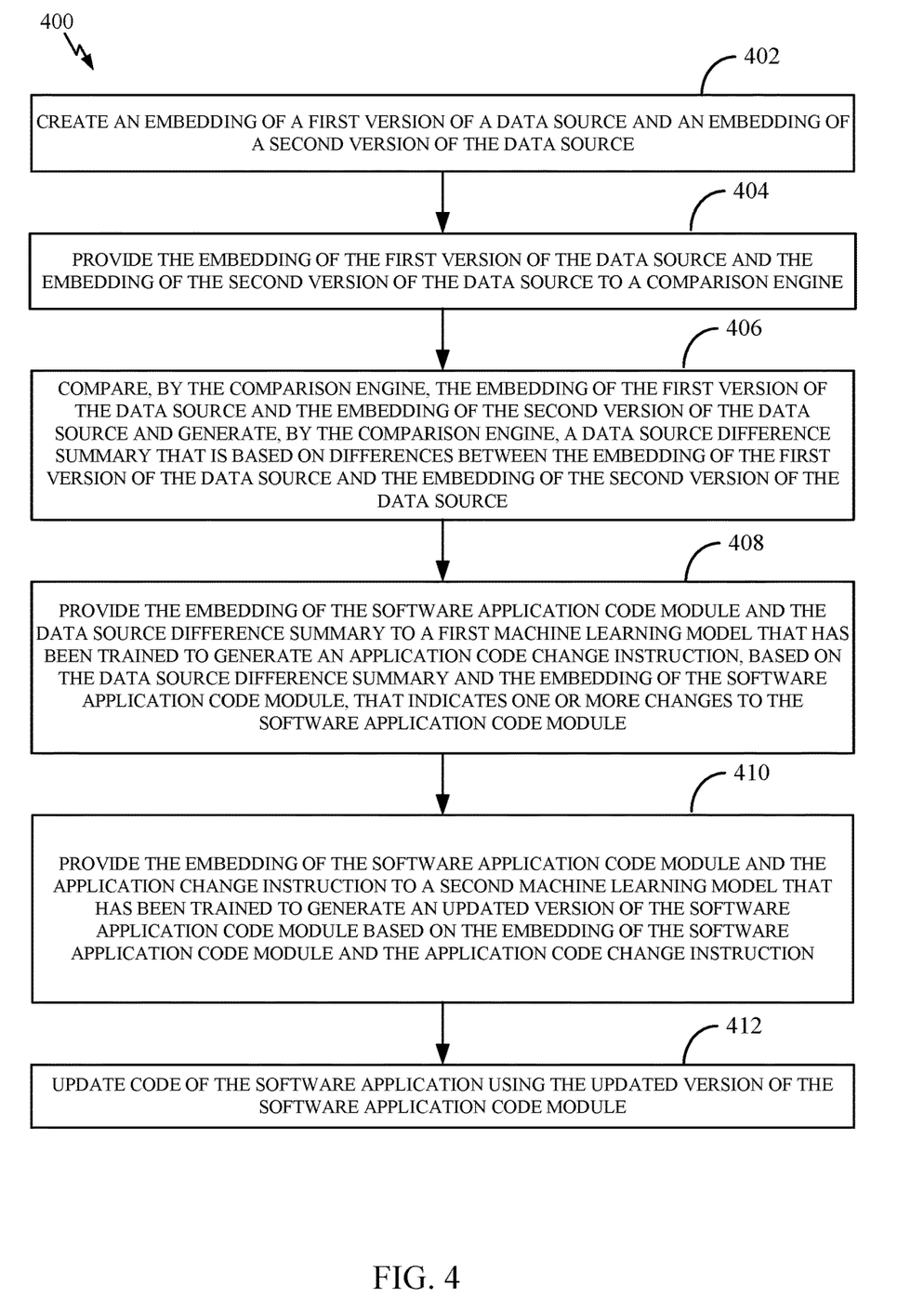
FIG. 4 depicts additional example operations related to automatically updating a software application to ensure compliance with an updated data source.

Additional Example Operations Related to Automatically Updating a Software Application to Ensure Compliance with an Updated Data Source FIG. 4 depicts additional example operations 400 related to automatically updating a software application to ensure compliance with an updated data source. For example, operations 400 may be performed by the components described in FIG. 1 and FIG. 2.

Operations 400 begin at step 402 with creating an embedding of a first version of a data source and an embedding of a second version of the data source. As described above, embeddings may be created at a selected granularity Operations 400 continue at step 404 with providing the embedding of the first version of the data source and the embedding of the second version of the data source to a comparison engine.

Operations 400 continue at step 406 with comparing, by the comparison engine, the embedding of the first version of the data source and the embedding of the second version of the data source and generating, by the comparison engine, a data source difference summary that is based on differences between the embedding of the first version of the data source and the embedding of the second version of the data source.

In some embodiments, the data source comparison engine may, for example, use cosine similarity or a Jaccard index to determine similarity between the two versions of the data source (e.g., which may involve comparing embeddings of the two versions) and generate the data source difference summary. In some embodiments, the data source difference summary may contain, for example, a description of the change that has been made and/or portions of the embeddings of the first and second versions of the data source that contain a change.

Operations 400 continue at step 408 with providing the embedding of the software application code module and the data source difference summary to a first machine learning model, wherein the first machine learning model has been trained to generate an application code change instruction, based on the data source difference summary and the embedding of the software application code module, that indicates one or more changes to the software application code module. The application code change instruction may be, for example, a plain language description of how to update the software application code module. The instruction may include which variables, formulas, or other portions of the software application code should be updated in response to changes in the data source. The first machine learning model may be, for example, a natural language processing algorithm or a large language model.

Operations 400 continue at step 410 with providing the embedding of the software application code module and the application change instruction to a second machine learning model, wherein the second machine learning model has been trained to generate an updated version of the software application code module based on the embedding of the software application code module and the application code change instruction. The second machine learning model may be, for example, a generative model such as a Generative Adversarial Network (GAN) or a Variational Autoencoder (VAE).

Operations 400 continue at step 412 with updating code of the software application using the updated version of the software application code module.

Figure 5:
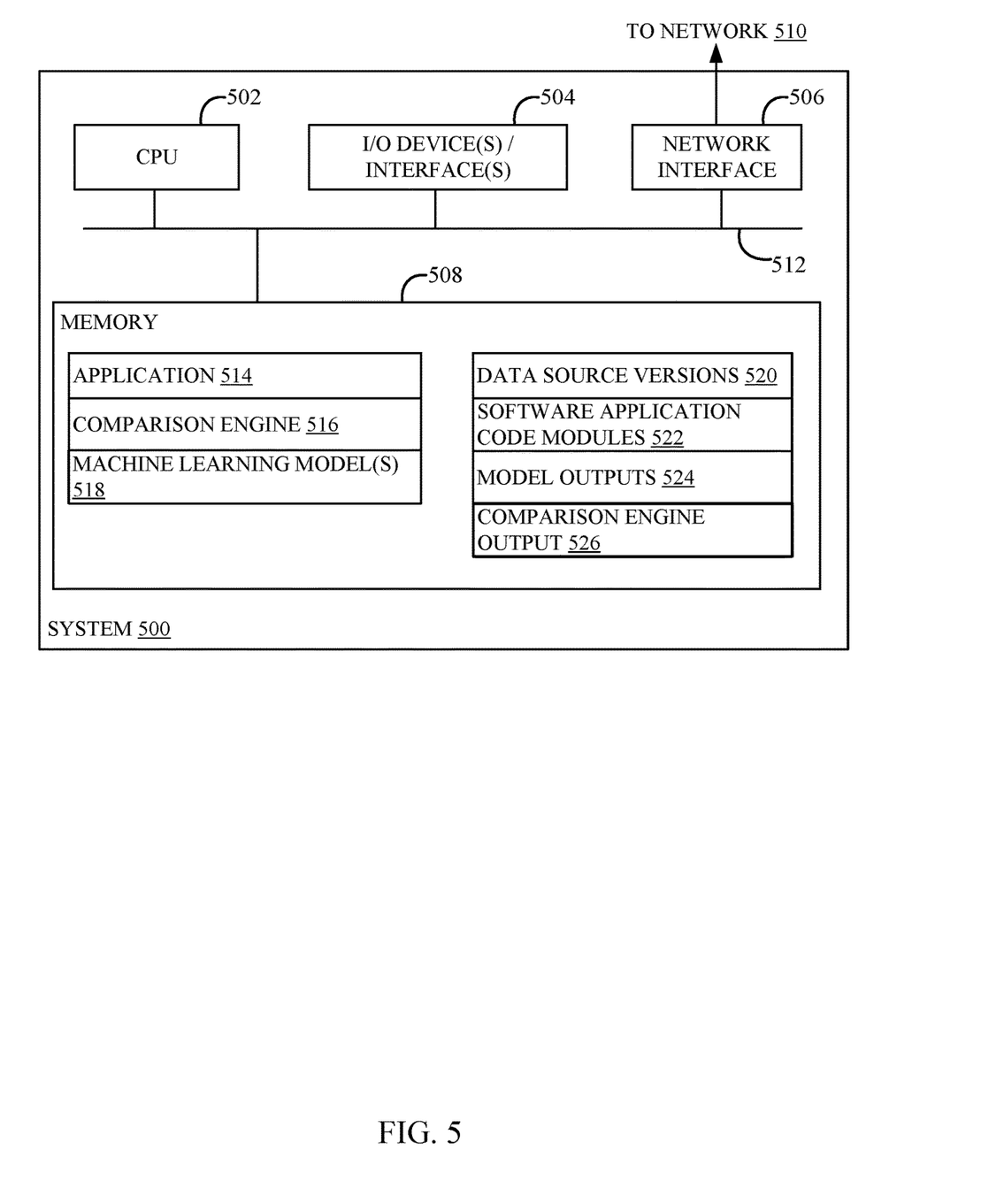
FIG. 5 depicts an example of a processing system for automatically updating a software application to ensure compliance with an updated data source.

Example of a Processing System for Automatically Updating a Software Application to Ensure Compliance with an Updated Data Source FIG. 5 illustrates an example system 500 with which embodiments of the present disclosure may be implemented. For example, system 500 may be configured to perform operations 300 of FIG. 3, operations 400 of FIG. 4 and/or to implement one or more components as in FIG. 1 or FIG. 2.

System 500 includes a central processing unit (CPU) 502, one or more I/O device interfaces 504 that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes application 514, proactive intervention system 516, and one or more machine learning models 518. Application 514 may be representative of an application corresponding to the software application code 123 of FIG. 1. In some embodiments, comparison engine 516 may be representative of comparison engine 110 of FIG. 1 and machine learning model(s) 518 may be representative of code update engine 100 of FIG. 1 and FIG. 2, the first machine learning model 120 of FIG. 1 and FIG. 2, and/or the second machine learning model 130 of FIG. 1 and FIG. 2.

Memory 508 further comprises data source versions 520, which may correspond to data source version one 103 and data source version two 113 of FIG. 1. Memory 508 further comprises software application code modules 522 which correspond to the modules of software application code 123 found in FIG. 1. Memory 508 further comprises model outputs 524, which may include application code change instruction 223 of FIG. 2 as well as any outputs of code update engine 100 of FIG. 1 and FIG. 2, the first machine learning model 120 of FIG. 1 and FIG. 2, and/or the second machine learning model 130 of FIG. 1 and FIG. 2. Memory 508 further comprises comparison engine output 526, which may correspond to the output of comparison engine 110 of FIG. 1 as well as the data source difference summary 203 of FIG. 2.

It is noted that in some embodiments, system 500 may interact with one or more external components, such as via network 510, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automatically updating a software application to ensure compliance with an updated data source, the method comprising:
   providing an embedding of a first version of a data source and an embedding of a second version of the data source to a comparison engine, wherein the comparison engine has been configured to:
     compare the embedding of the first version of the data source and the embedding of the second version of the data source; and
     generate a data source difference summary that is based on differences between the embedding of the first version of the data source and the embedding of the second version of the data source;
   providing an embedding of a software application code module and the data source difference summary to a code update engine, wherein the code update engine comprises one or more machine learning models that have been trained to generate an updated version of the software application code module based on the embedding of the software application code module and the data source difference summary; and
   updating code of the software application using the updated version of the software application code module.

2. The method of claim 1, wherein the code update engine further comprises:
   a first machine learning model that has been trained to generate an application code change instruction, based on the data source difference summary and the embedding of the software application code module, that indicates one or more changes to the software application code module; and
   a second machine learning model that has been trained to generate an updated version of the software application code module based on the embedding of the software application code module and the application code change instruction.

3. The method of claim 2, wherein the second machine learning model was trained through a supervised learning process to generate updated software application code modules that are semantically and syntactically consistent with existing software code.

4. The method of claim 2, wherein the first machine learning model is a large language model.

5. The method of claim 2, wherein the second machine learning model is a generative machine learning model.

6. The method of claim 1, wherein the comparison engine uses cosine similarity to compare the embedding of the first version of the data source to the embedding of the second version of the data source.

7. The method of claim 1, wherein the comparison engine uses a Jaccard index to compare the embedding of the first version of the data source to the embedding of the second version of the data source.

8. The method of claim 1, wherein the embedding of the software application code module comprises a plurality of embeddings of subsets of the software application code module, and wherein the subsets of the software application code module correspond to a configured subset size.

9. The method of claim 8, wherein the code update engine determines one or more particular subsets of the subsets of the software application code module that are to be changed based on the plurality of embeddings of the subsets of the software application code module.

10. A method for automatically updating a software application to ensure compliance with an updated data source, the method comprising:
creating an embedding of a first version of a data source;
creating an embedding of a second version of the data source;
providing the embedding of the first version of the data source and the embedding of the second version of the data source to a comparison engine, wherein the comparison engine has been configured to:
compare the embedding of the first version of the data source and the embedding of second version of the data source; and
generate a data source difference summary that is based on differences between the embedding of the first version of the data source and the embedding of the second version of the data source;
creating an embedding of a software application code module;
providing the embedding of the software application code module and the data source difference summary to a first machine learning model that has been trained to generate an application code change instruction, based on the data source difference summary and the embedding of the software application code module, that indicates one or more changes to the software application code module; and
providing the embedding of the software application code module and the application code change instruction to a second machine learning model that has been trained to generate an updated version of the software application code module based on the embedding of the software application code module and the application code change instruction; and
updating code of the software application using the updated version of the software application code module.

11. A system, comprising: one or more processors; and a memory comprising instructions that, when executed by the one or more processors, cause the system to perform a method for automatically updating a software application to ensure compliance with an updated version of a data source, the method comprising:
providing an embedding of a first version of a data source and an embedding of a second version of the data source to a comparison engine, wherein the comparison engine has been configured to:
compare the embedding of the first version of the data source and the embedding of the second version of the data source; and
generate a data source difference summary that is based on differences between the embedding of the first version of the data source and the embedding of the second version of the data source;
providing an embedding of a software application code module and the data source difference summary to a code update engine, wherein the code update engine comprises one or more machine learning models that have been trained to generate an updated version of the software application code module based on the embedding of the software application code module and the data source difference summary; and
updating code of the software application using the updated version of the software application code module.

12. The system of claim 11, wherein the code update model further comprises:
a first machine learning model that has been trained to generate an application code change instruction, based on the data source difference summary and the embedding of the software application code module, that indicates one or more changes to the software application code module; and
a second machine learning model that has been trained, based on the embedding of the software application code module and the application code change instruction, to generate an updated version of the software application code module and update code of the software application using the updated version of the software application code module.

13. The system of claim 12, wherein the first machine learning model has been trained through a supervised learning process to generate updated versions of software application code modules that are semantically and syntactically consistent with existing software code.

14. The system of claim 12, wherein the second machine learning model has been trained through a supervised learning process to generate updated versions of software application code modules that accurately reflect changes from the first version of the data source to the second version of the data source.

15. The system of claim 12, wherein the first machine learning model is a natural language processing algorithm.

16. The system of claim 12, wherein the second machine learning model is a generative model.

17. The system of claim 11, wherein the comparison engine uses cosine similarity to compare the first version of the data source to the second version of the data source.

18. The system of claim 11, wherein the comparison engine uses a Jaccard index to compare the first version of the data source to the second version of the data source.

19. The system of claim 11, wherein the embedding of the software application code module comprises a plurality of embeddings of subsets of the software application code module, and wherein the subsets of the software application code module correspond to a configured subset size.

20. The system of claim 19, wherein the code update engine determines one or more particular subsets of the subsets of the software application code module that are to be changed based on the plurality of embeddings of the subsets of the software application code module.

* * * * *